C. H. HELMS.
Machinery for Trimming the Heels of Boots and Shoes.
No. 5,424. Reissued May 27, 1873.
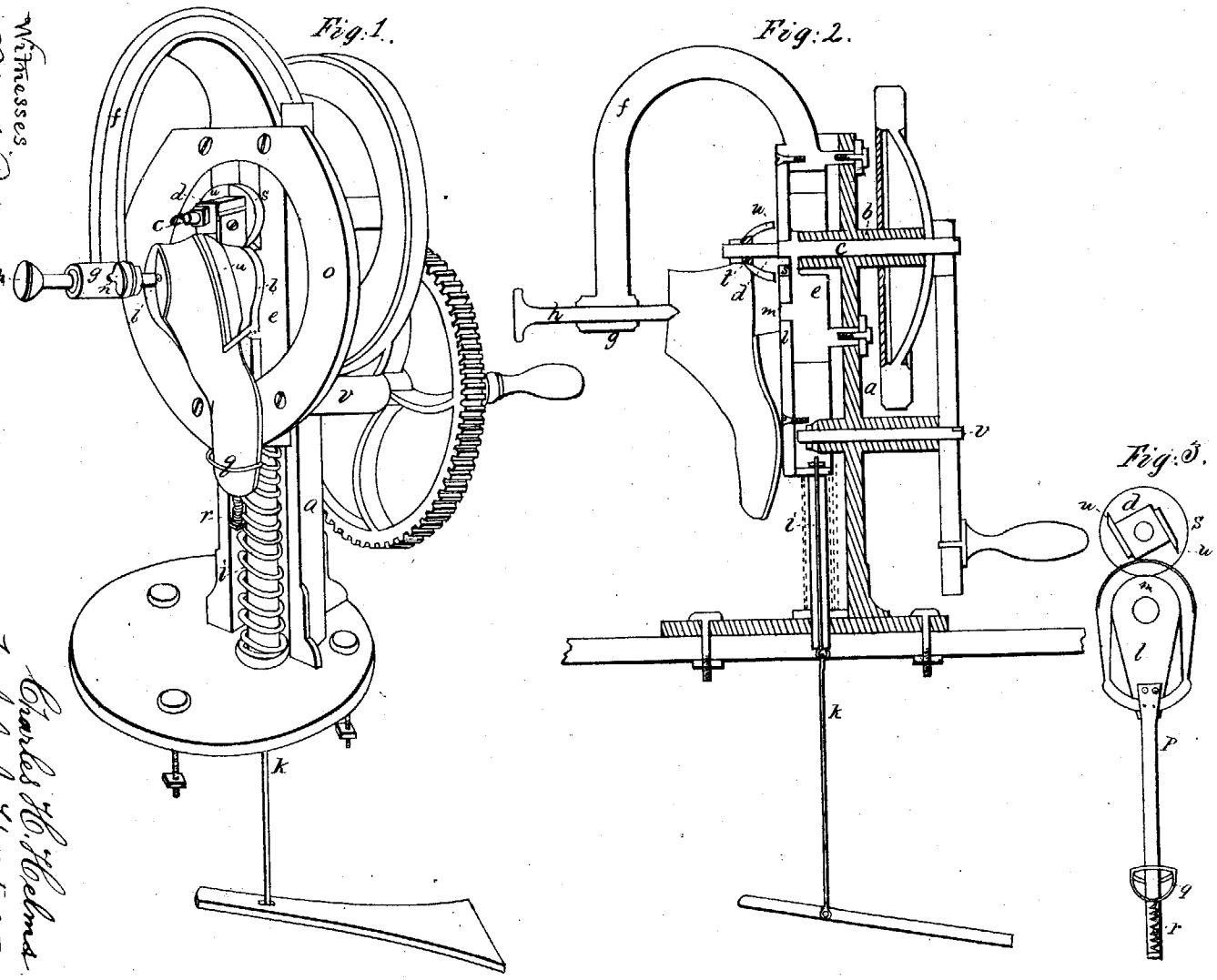
Witnesses.
Wm H. Bates
Davis Moulden
Charles H. Helms
by John J. Halsted
Atty.
A.M. PHOTO-LITHOGRAPHIC CO. N.Y. (OSBORNE'S PROCESS.)

UNITED STATES PATENT OFFICE.

CHARLES H. HELMS, OF POUGHKEEPSIE, NEW YORK, ASSIGNOR, BY MESNE ASSIGNMENTS, TO JAMES W. BROOKS, TRUSTEE.

IMPROVEMENT IN MACHINERY FOR TRIMMING THE HEELS OF BOOTS AND SHOES.

Specification forming part of Letters Patent No. 31,666, dated March 12, 1861; reissue No. 1,740, dated August 16, 1864; reissue No. 5,424, dated May 27, 1873; application filed April 25, 1873.

*To all whom it may concern:*

Be it known that CHARLES H. HELMS, of Poughkeepsie, in the county of Dutchess and State of New York, invented an Improved Machine for Trimming the Heels of Boots and Shoes, of which the following is a specification:

The invention relates to the organization of a machine for trimming the edges of heels of boots and shoes. In this invention the heel-edge is reduced by a rotary cutter, and to present the shoe in position for the action of such a cutter I mount or fasten it in a vertical frame, or in a jack that holds the boot or shoe in a vertical plane passing through the cutter at a right angle to its axis of rotation, suitable guiding or pattern mechanism or surfaces being employed to control or determine the form made by the cutter. The invention consists, primarily, in the combination, in a heel-trimming machine, of a rotary cutter, and a boot or shoe holding mechanism arranged in the same vertical plane, relative movement between the cutter-cylinder and the boot-holding mechanism, in connection with suitable guiding devices, enabling the heel-edge to be readily trimmed under the inspecting eye of the operator better than in other organizations for the same purpose made before this invention. The invention also consists in the combination of a vertical sliding frame, having bearings or centers of action on it, (parallel with the axis of a rotary cutter,) in which the boot or shoe is jacked with a rotary cutter whose shaft is journaled in a suitable standard that supports the sliding frame, so that the heel of the boot or shoe may be moved and pared or trimmed by the single operation of giving a half rotation to it on its supporting center. The invention also consists in the combination of a pattern-plate attached to the heel of the boot or shoe, so as to form one of the centers of the sliding frame on which the boot or shoe rotates, with a rotary cutter and a guide on its axis, working or resting on the pattern-plate to guide and limit the action of the cutters in shaping and trimming the heel of the boot or shoe. The invention further consists in the combination, with the cutter-stock, of a device to run in the rand or crease of the heel, and resting upon the counter of the boot or shoe, and thereby guide and limit the action of the cutters. Also, in the method of supporting the vertically-sliding frame upon a spiral spring in combination with a foot-lever, to enable the operative to move the sliding frame up and down at the same time he rotates the heel of the shoe with his hand under the action of the rotary cutters. The drawing represents a machine embodying the invention.

Figure 1 shows the machine in perspective elevation. Fig. 2 is a sectional elevation of it. Fig. 3 shows the cutter-stock and pattern-plate in elevation.

*a* denotes a standard or upright, having a stationary bearing, *b*, supporting a shaft, *c*, at the front end of which is the rotary cutter-stock *d*. In the front part of the standard *a* are vertical guide-ways, in which slides a vertical jack-frame, *e*, having extending from its top a curved arm, *f*, which bends over and forms a bearing, *g*, that carries a center-pin, *h*. The cutter-shaft *c* extends through a vertical slot in the jack-frame *e*, and said frame rests upon a stout spring, *i*, and is connected, by a rod, *k*, with a foot-treadle, pressure upon the treadle drawing down the frame against the stress of the spring, and the spring at other times pressing the frame up to hold the heel of the shoe to the cutter with a yielding pressure. At the front of the frame *e* is a pattern-plate, *l*, to which the tread-face of the heel is secured, a center-pin, *m*, extending from the frame into a center hole made in this pattern-plate, and the pin *m* and pin *h* forming the centers for the heel to turn upon, the pin being pressed up against the last and forcing the heel against the pattern-plate, said pin being fastened by a clamp-screw, *n*. Fixed to the frame is an annular plate, *o*, and extending from the plate *l* is a bar, *p*, upon which slides a toe-piece, *q*, forced over the toe of the boot or shoe by a spring, *r*. When the shoe is jacked the sole is pressed up to this plate *o*, and the pin *h* is then forced up to or into the last. The cutter-shaft carries a roll or flange, *s*, against which the edge of the pattern-plate bears, and the pattern-plate determines the general form of edge made by the cutters upon the heel, or the longitudinal form, the shape of the cutters, and other guiding devices, if necessary, determining the lateral form on the slant or taper of the heel-edge. At the front of the cutter-stock there may be a flange or edge for running in the rand-crease, and a guard, *t*, for running upon the counter, either of which devices will protect the counter and partially control the action of the cutters. The cutter-stock may have two or any other suitable number of cutting edges, *u*, the form of which corresponds to the form to be imparted to the edge of the heel and to bring the whole length of edge to be trimmed to the action of the cutting-edges. The jack-frame is, or may be, turned by hand. The cutter-shaft is driven by any suitable power. It is shown as bearing a fly-wheel, and as having a gear-pinion into which meshes a gear-wheel on a driving-shaft, *v*. It will be observed that the shoe to be heel-trimmed hangs in vertical position, an axial line running through the center of the heel, or the line of the two center-pins *h m* being horizontal, this arrangement and the location of the cutter presenting the best arrangement of mechanism for the purpose of trimming a heel by a rotary cutter.

I claim—

1. In a heel-trimming machine, the combination substantially as described, of a rotary-cutter or cutter-stock, and a vertical jack or frame for holding the boot or shoe to be heel-trimmed.

2. The rotary cutter, the vertical jack-frame, and a pattern-plate or its equivalent, combined to operate substantially as described.

3. In combination with the rotary cutter or cutter-stock, fixed or turning on a horizontal shaft supported in a suitable bearing, a sliding jack-frame, substantially as described, that holds the heel-edge up to the cutter against the stress of a spring, and that enables the shoe to be drawn down or controlled in position by the operator by pressure upon the treadle.

4. In combination with the pattern-plate *l*, a roll or circular projection upon the cutter-shaft, substantially as described, against which the pattern-edge bears.

5. In combination with the rotary cutter and the boot or shoe holding mechanism, a guide for running in the rand-crease and a guide, substantially as described, for running upon the counter.

JAMES W. BROOKS,
*Trustee.*

Witnesses:
FRANCIS GOULD,
M. W. FROTHINGHAM.